United States Patent
Holis et al.

(10) Patent No.: US 11,824,376 B1
(45) Date of Patent: Nov. 21, 2023

(54) WIRELESS POWER TRANSMITTER WHICH DETECTS LOW COUPLING WITH A WIRELESS POWER RECEIVER, AND METHODS FOR WIRELESS POWER TRANSMISSION

(71) Applicant: NXP USA, Inc., Austin, TX (US)

(72) Inventors: Radek Holis, Karolinka (CZ); Huan Mao, Suzhou (CN); Dengyu Jiang, Suzhou (CN)

(73) Assignee: NXP USA, Inc., Austin, TX (US)

( * ) Notice: Subject to any disclaimer, the term of this patent is extended or adjusted under 35 U.S.C. 154(b) by 6 days.

(21) Appl. No.: 17/664,311

(22) Filed: May 20, 2022

(30) Foreign Application Priority Data

May 9, 2022 (CN) .......................... 202210496994.5

(51) Int. Cl.
| | |
|---|---|
| *H02J 50/12* | (2016.01) |
| *H02J 50/40* | (2016.01) |
| *H02J 50/60* | (2016.01) |
| *H02J 50/80* | (2016.01) |
| *H02J 50/90* | (2016.01) |

(52) U.S. Cl.
CPC .............. *H02J 50/90* (2016.02); *H02J 50/12* (2016.02); *H02J 50/402* (2020.01); *H02J 50/60* (2016.02); *H02J 50/80* (2016.02)

(58) Field of Classification Search
CPC .. G01R 27/2688; H02J 7/00034; H02J 50/10; H02J 50/12; H02J 50/402; H02J 50/60; H02J 50/80; H02J 50/90
See application file for complete search history.

(56) References Cited

U.S. PATENT DOCUMENTS

| | | | |
|---|---|---|---|
| 2013/0257168 A1* | 10/2013 | Singh | H02J 50/12 307/104 |
| 2016/0261137 A1 | 9/2016 | Riehl | |
| 2018/0131243 A1* | 5/2018 | Hamaguchi | H02J 50/12 |
| 2020/0212713 A1 | 7/2020 | Jiang et al. | |
| 2020/0259369 A1* | 8/2020 | Stingu | H02J 50/50 |
| 2021/0167637 A1* | 6/2021 | Schwartz | H02J 50/70 |
| 2023/0179028 A1* | 6/2023 | Chung | H02J 50/80 320/108 |

FOREIGN PATENT DOCUMENTS

KR 101731447 B1 4/2017

\* cited by examiner

*Primary Examiner* — Levi Gannon

(57) ABSTRACT

A wireless power transmitter to wirelessly transmit power applies a current or voltage to a transmitter coil based on an indication of coupling being in a predetermined range. The current or voltage which is applied causes the transmitter coil to transmit a high power (HP) DPING. A response to the HP DPING indicates that a wireless power receiver is located on a charging surface and a power signal is then transmitted to the wireless power receiver to charge or power an electronic device coupled to the wireless power receiver. Use of HP DPING improves the wireless power transmission performance including transmission area and interoperability of wireless power transmitters with low coupling to wireless power receivers.

20 Claims, 4 Drawing Sheets

WIRELESS POWER TRANSMITTER WHICH DETECTS LOW COUPLING WITH A WIRELESS POWER RECEIVER, AND METHODS FOR WIRELESS POWER TRANSMISSION

FIELD OF USE

This disclosure generally relates to wireless power transmission, and more particularly to wireless power transmission by a wireless power transmitter which detects low coupling with a wireless power receiver.

BACKGROUND

A wireless power transmitter has one or more transmitter coils located on a plane of a charging surface. A wireless power receiver is placed on the charging surface. A voltage or current applied to the transmitter coil generates a power signal in the form of a magnetic flux which couples with the wireless power receiver to charge a battery of an electronic device comprising the wireless power receiver or to power the electronic device.

Figure 1:
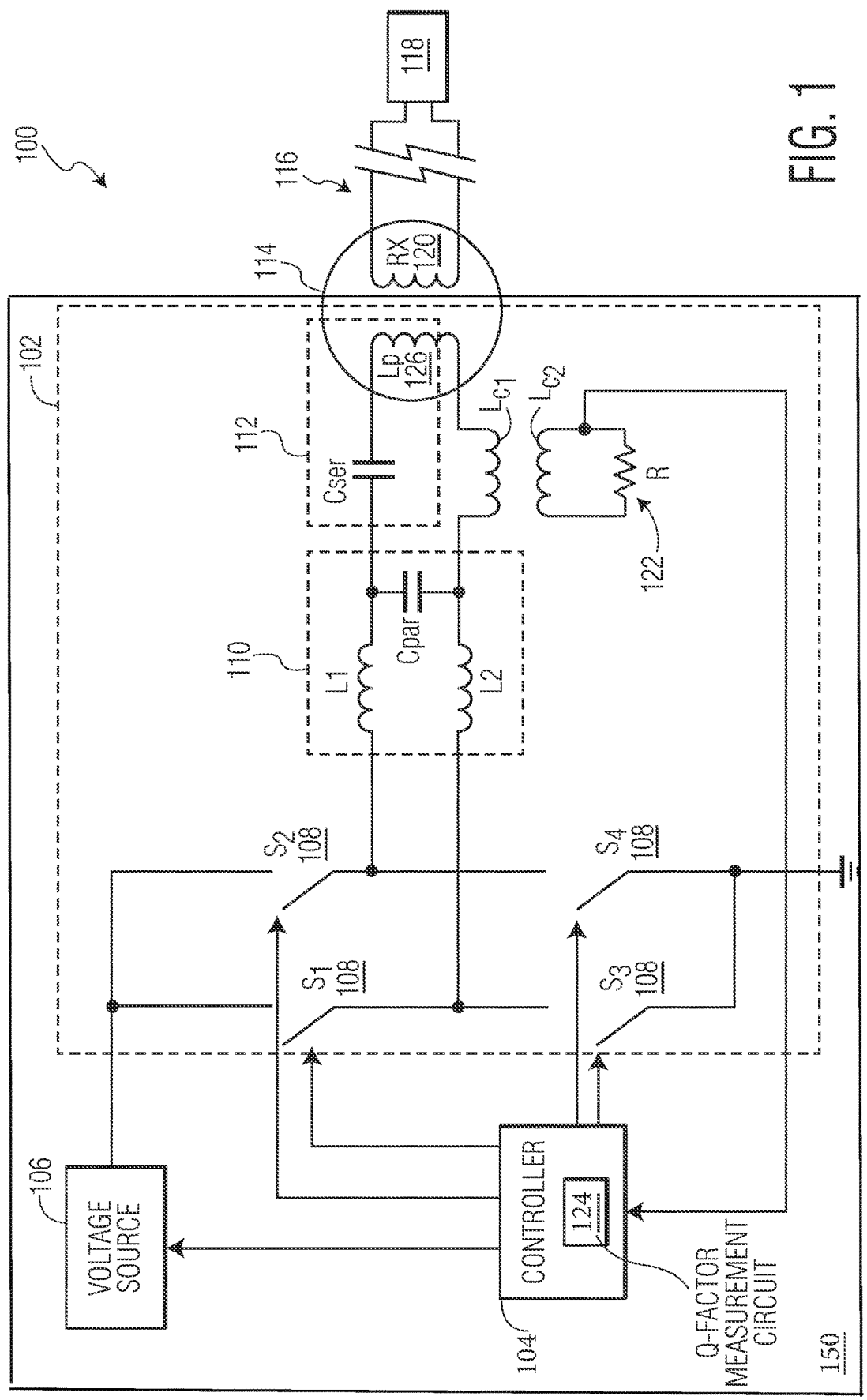
FIG. 1 is a block diagram of an example wireless power transmitter to perform wireless power transmission in accordance with an embodiment.

The drawings are for the purpose of illustrating example embodiments, but it is understood that the embodiments are not limited to the arrangements and instrumentality shown in the drawings.

DETAILED DESCRIPTION

A wireless power transmitter applies a modulated signal to a transmitter coil. In an example, the modulated signal comprises a digital ping (DPING) for detecting whether a wireless power receiver is located on a charging surface having the transmitter coil. The DPING is one or more pulses with a specified power which results in the wireless power transmitter transmitting a power signal. If the wireless power transmitter receives a response to the DPING, then the wireless power receiver is detected on the charging surface. The wireless power transmitter is arranged to further transmit a power signal which is received by the wireless power receiver and results in charging a battery of an electronic device comprising the wireless power receiver or powering the electronic device. If the wireless power transmitter does not receive a response, then the wireless power transmitter generates an additional DPING or stops generating the DPING. The wireless power transmitter does not receive the response because the wireless power transmitter has a low coupling to the wireless power receiver, there is a foreign object located on the charging surface, or there is no foreign object or no wireless power receiver located on the charging surface. Wide interoperability of the wireless power transmitter (one wireless power transmitter can provide charging to different types of electronic devices) is prevented and only certain types of electronic devices with good coupling of its wireless power receiver can be charged or powered.

Embodiments disclosed herein are directed to the wireless power transmitter detecting a low coupling with a wireless power receiver located on the charging surface when a response to a DPING is not received. In an example, the coupling is indicated by a Q-Factor measured by the wireless power transmitter. If the Q-Factor is not in a defined range, then the wireless power transmitter stops generating the DPING because there is no wireless power receiver or no foreign object located on the charging surface or there is a foreign object located on the charging surface. If the Q-Factor is in the defined range, then the wireless power transmitter could have a low coupling with a wireless power receiver located on the charging surface. The wireless power transmitter generates the DPING with a higher power, referred to as a high power DPING (HP_DPING) which comprise one or more pulses with a higher power than DPING. In examples, the wireless power transmitter generates a HP_DPING in a round of pinging applied to a respective transmitter coil of the wireless transmitter and the wireless transmitter may perform one or more rounds. If a response to the HP_DPING is received by a transmitter coil, then a wireless power receiver is located on the charging surface. The transmitter coil is arranged to then transmit a power signal which is received by the wireless power receiver and results in charging a battery of the electronic device or powering the electronic device. If a response to the HP_DPING is not received in one or more rounds of pinging, then the wireless power transmitter stops generating the HP_DPING because a battery of the electronic device cannot be charged or the electronic device cannot be powered when the HP_DPING is generated. In an example, the defined range is within a standard range of Q-Factors used to detect foreign objects. By measuring the Q-Factor and determining that the Q-Factor is in the defined range before the wireless power transmitter generates the HP_DPING, the wireless power transmitter is able to determine that the power signal transmitted based on the HP_DPING will not heat and damage a foreign object located on the charging surface or the charging surface itself. Well known instructions, protocols, structures, and techniques have not been shown in detail in order not to obfuscate the description.

Example Systems

FIG. 1 is a block diagram of an example wireless power transmission system 100 in accordance with an exemplary embodiment of the invention. The wireless power transmission system 100 may include a wireless power transmitter 150 and a wireless power receiver 116 coupled to an electronic device 118 such as a handheld wireless phone, a wearable device (e.g., watch, glasses, fitness tracker, sleeping monitor), or other type of electronic device. In some examples, the electronic device 118 and the wireless power receiver 116 may form an integrated device. The wireless power transmitter 150, the wireless power receiver 116, and the electronic device 118 may be each implemented using circuitry such as one or more of analog circuitry, mix signal circuitry, memory circuitry, logic circuitry, and processing circuitry that executes code stored in a memory that when executed by the processing circuitry perform the disclosed functions, among other implementations.

The wireless power transmitter 150 may include a power circuit 102, a controller 104, and a voltage source 106 among other components. The power circuit 102 may generate a power signal. In an example, the power circuit 102 may include one or more switches 108, a filter circuit 110, and a resonance circuit 112. The voltage source 106 may generate a DC voltage to drive the one or more switches 108. In an example, the voltage source 106 may be a DC/DC converter. The switches 108 may take the form of transistors such as gallium-nitride field effect transistors or MOSIFET transistors and be arranged in a full bridge configuration as shown or a half bridge configuration in other arrangements. The switches 108 labeled as S1, S2 may be coupled to the voltage source 106 and the switches 108 labeled as S3, S4 may be coupled to ground in an example. The switches S1, S2 are further coupled to the filter circuit 110. In an example, the filter circuit 110 may be a "pi" filter as known by one skilled in the art and include inductors L1, L2 and a parallel capacitance Cpar to filter out higher order harmonics resulting from the switching. The resonance circuit 112 may have an inductor Lp in the form of a transmitter coil 126 and a capacitor Cser to generate a coil current at an operating frequency of the wireless power transmitter 150. The transmitter coil 126 may be located on a charging surface 114 such that current flowing through the transmitter coil 126 or voltage applied across the transmitter coil 126 causes the transmitter coil 126 to transmit a power signal. The charging surface 114 may be a planar pad on which the wireless power receiver 116 may be placed to charge a battery of the electronic device 118 or to power the electronic device 118 and the transmitter coil 126 may be arranged as a planar coil on the charging surface 114 in an example.

The power circuit 102 may be coupled to the controller 104 which has a plurality of outputs which each provide a signal to open or close one or more of the switches 108. The signals may be pulse width modulated signals (PWM) with a duty cycle such as a 50% constant duty cycle and causes the switches 108 to open or close in accordance with the duty cycle. The switching may have an operating frequency of 127.7 kHz which is a typical for the wireless power transmitter 150. Further, in an example, the PWM signals applied to the switches S1, S2 may be complementary to the PWM signals applied to the switches S3, S4. The controller 104 may also provide a signal to the voltage source 106 indicative of an output voltage which the voltage source 106 is to apply to the switches 108.

In an example, the transmitter coil 126 may transmit a power signal based on the switching and magnetic flux of the power signal couples with a receiver coil 120 of the wireless power receiver 116 to induce a voltage or current in the receiver coil 120 to transmit power from the transmitter coil 126 to the wireless power receiver 116. In an example, the transmitted power may be used to charge the battery of the electronic device 118 or power the electronic device 118.

In an example, a wireless power receiver 116 located on a charging surface may be detected by a wireless power transmitter 150 generating an analog ping (APING). The APING is a modulated signal in the form of one or more pulses and a specified power. The power may be based on one or more of a peak-to-peak voltage of the pulse and a peak-to-peak current of the pulse as a function of time. In an example, the controller 104 may generate the APING based on a switching of the switches 108 which causes a current and voltage to be applied to the transmitter coil 126 which in turn transmits a power signal in the form of magnetic flux. A peak-to-peak current of the transmitter coil 126 at a sensing circuit 122 may be then measured. The sensing circuit 122 may comprise inductors Lc1 and Lc2 and a load R. The current in the transmitter coil 126 may cause the inductor Lc1 to generate a magnetic flux which couples to inductor Lc2 and induces a voltage across the load R indicative of the peak-to-peak current of the transmitter coil 126. The voltage across the load R is provided to the controller 104 having circuitry to measure a peak-to-peak voltage. The peak-to-peak voltage may differ depending on whether a foreign object such as a passive metal object or a wireless power receiver 116 is located on the charging surface 114. If a foreign object or a wireless power receiver 116 is located on the charging surface, then the magnetic flux of the power signal may couple with the foreign object or wireless power receiver and the peak-to-peak voltage across the load R may be lower compared to if there is no foreign object or wireless power receiver 116 located on the charging surface 114. If the measured peak-to-peak voltage indicates that no foreign object or wireless power receiver 116 is located on the charging surface 114, then the wireless power transmitter 150 generates the APING again.

If the measured peak-to-peak voltage indicates that a foreign object or wireless power receiver is located on the charging surface 114, then the wireless power transmitter 150 generates a digital ping (DPING). DPING is specified by Wireless Power Consortium (WPC) which defines Qi which is an open interface standard that specifies a protocol for performing wireless charging of electronic devices. Qi specifies operation to detect a wireless power receiver located on a charging surface by a wireless power transmitter generating the DPING. The DPING is a modulated signal in the form of one or more pulses having a specified power which is applied to the transmitter coil 126. The power may be based on a peak-to-peak voltage of the pulse and a peak-to-peak current of the pulse as a function of time. A period of the DPING is typically larger than that of the APING. In an example, the controller 104 is arranged to generate the DPING based on switching of the switches 108 which causes a current and voltage to be applied to the transmitter coil 126 and which in turn transmits a power signal based on the DPING. In an example, the wireless power receiver 116 may have a sensing circuit (not shown) similar to sensing circuit 122 to detect the power signal based on the DPING. If the wireless power receiver 116 detects the power signal based on the DPING, then the wireless power receiver 116 provides a response by applying a current to the receiver coil 120 at a frequency to induce a current or voltage change in the transmitter coil 126. The controller 104 may detect the induced current or voltage via the sensing circuit 122 as the response. The response may be a signal strength packet which indicates a strength of the power signal received by the wireless power receiver 116 and indicates that magnetic flux of the power signal based on the DPING coupled with the wireless power receiver 116 located on the charging surface 114. The transmitter coil 126 may then output a power signal which results in the electronic device 116 being charged. In an example, the power signal output may be based on a modulated signal with a peak-to-peak voltage at least equal to a peak-to-peak voltage of the DPING applied to the transmitter coil 126. In an example, a period of the modulated signal of the power signal output may be longer than a period of DPING. If a response is not received or not received in a defined time interval, then the wireless power transmitter 150 typically stops generating the DPING or generates the DPING again as another round of DPING.

The wireless power transmitter 150 may not receive a response to the DPING for many reasons. If no foreign object or no wireless power receiver 116 is present on the charging surface 114 or a foreign object is present on the charging surface 114, then the wireless power transmitter 150 may not receive the response. Further, the wireless power transmitter 150 may not receive the response when the transmitter coil 126 has a low coupling to the wireless power receiver 116. In an example, an attenuation of the magnetic flux transmitted by the transmitter coil 126 as a result of the DPING coupling with the receiver coil 120 may be characteristic of a low coupling. A coupling factor may indicate a level of coupling and in particular an amount of flux which reaches the receiver coil 120. The coupling factor is a value between zero and one where a value of one indicates perfect coupling when all flux generated by the transmitter coil 126 penetrates the receiver coil 120. The value of zero indicates that the transmitter coil 126 and the receiver coil 120 are independent of each other. The coupling factor is determined by physical properties of the transmitter coil 126 and receiver coil 120, including a distance between the transmitter coil 126, receiver coil 120, and their relative sizes. It is further determined by a shape of the coils and the angle between them. If coils are axially aligned, a displacement causes a decrease of the coupling factor. The coupling factor in the range of 0.4 to 0.7 are typical for inductive wireless charging applications. A low coupling factor may also indicate that magnets are located around the receiver coil 120.

If the coupling factor is low, then the DPING generated by the wireless power transmitter 150 may be insufficient to cause enough current to be induced in the receiver coil 120 and cause the wireless power receiver 116 to respond to the DPING. The wireless power receiver 116 may not respond even though the wireless power receiver 116 is located on the charging surface 114. As a result, the wireless power transmitter 150 will typically stop generating the DPING. A wireless power transmitter 150 which operates in accordance with Qi prevents wide interoperability of different wireless power receivers (one wireless power transmitter can provide charging to different types of electronic devices) and only certain types of electronic devices 118 with good coupling of its wireless power receiver 116 can be charged or powered.

Embodiments disclosed herein are directed to the wireless power transmitter 150 detecting a low coupling with a wireless power receiver 116 located on the charging surface 114 when a response to a DPING is not received. In some examples, the coupling that is determined may be indicated by the coupling factor which requires knowing sizes of inductors, physical distances between inductors, and alignment between inductors and which would need to be communicated by the wireless power receiver 116 located on the charging surface 114 to the wireless power transmitter 150 to determine the coupling factor. To simplify the determination of the coupling, the wireless power transmitter 150 may measure a Q-Factor indicative of the coupling factor. Unlike the coupling factor, the Q-Factor does not require knowing the sizes of inductors, physical distances between inductors, or alignment between inductors.

In an example, the controller 104 may have a Q-Factor measurement circuit 124 to measure the Q-Factor. The Q-Factor measurement may comprise applying one or more pulses to the transmitter coil 126 to cause the resonant circuit 112 to ring and measuring a rate of decay of voltage or current of the resonant circuit 112. In an example, the controller 104 may detect a voltage across the load R as a function of time and the Q-Factor measurement circuit 124 may calculate the Q-Factor in an example as:

$$Q=\pi/(\ln(\text{Rate of Decay}))$$

The Q-Factor may indicate what fraction of the magnetic flux of the power signal transmitted by the transmitter coil 126 may penetrate a wireless power receiver 116 on the charging surface 114 to induce a current. The more flux that penetrates the wireless power receiver 116, the better the coupling, the decay will be slower, and the resonance circuit 112 of wireless power transmitter 150 may have a higher Q-Factor. The less flux that penetrates the wireless power receiver 116, the worse the coupling, the decay will be faster and the resonance circuit 112 of the wireless power transmitter 150 may have a lower Q-Factor. A low Q-Factor may also indicate that a foreign object is present which absorbs magnetic flux of the power signal transmitted by the transmitter coil 126.

The controller 104 may then determine whether the Q-Factor that is measured is in a defined range. In an example, the defined range may be within a standard range of Q-Factors used to detect foreign objects.

If the Q-Factor is in the defined range, then a wireless power receiver 116 may be located on the charging surface 114. The wireless power transmitter 150 generates HP_DPING. The HP_DPING may be one or pulses which has a higher power than pulses of DPING. In an example, the higher power may result from a longer duty cycle of the PWM signals causing the switching of the switches S1-S4 to generate the pulses compared to the duty cycle of the PWM signals to generate the pulses of DPING. Additionally, or alternatively, in an example, the higher power may result from a lower operating frequency of the PWM signals causing the switching of the switches to generate the pulses compared to the operating frequency of the PWM signals to generate the pulses of DPING. Still additionally, or alternatively, in an example, the higher power may be based on a peak-to-peak voltage of the HP_DPING being higher than a peak-to-peak voltage of the DPING. If the wireless power transmitter 150 receives a response to the HP_DPING in the form of a signal strength packet based on the sensing circuit 122, then the wireless power receiver 116 is detected on the charging surface 114. The transmitter coil 126 is arranged to then transmit a power signal to charge the electronic device 116. The power signal which is transmitted has a higher power than the power signal transmitted if the electronic device 116 responded to the DPING. In an example, the power signal output may be based on a modulated signal applied to the transmitter coil 126 for a period with one or more of a peak-to-peak voltage at least equal to a peak-to-peak voltage of the HP_DPING with an operating frequency. If the wireless power transmitter 150 does not receive a response, then the wireless power transmitter 150 generates the HP_DPING again as another round of HP_DPING or stops generating the HP_DPING because the coupling between the wireless power transmitter 150 and the wireless power receiver 116 may be still poor to support charging the battery of the electronic device 118 or powering the electronic device 118.

If the Q-Factor is not in the defined range, then there is a foreign object located on the charging surface or there is no foreign object or wireless power receiver located on the charging surface 114. No HP_DPING is generated. If the HP_DPING was to be generated when the Q-Factor is not in the defined range, magnetic flux associated with the HP_DPING might produce eddy currents in a foreign object on the charging surface 114 which in turn produces high temperatures in the foreign object and damage to the foreign object and charging surface 114.

In an example, the wireless transmitter 150 may have one or more power circuits 102 (not shown) each with a transmitter coil. The transmitter coils of each power circuit 102 may be located on the charging pad 114. The transmitter coils may be planar coils on the charging surface 114 which overlap or do not overlap with each other. The plurality of transmitter coils may allow for improved coupling between the receiver coil 120 and the transmitter coil 126 when the wireless power receiver 116 is randomly positioned on the charging surface 114 rather than specifically positioned so the transmitter coil 126 and receiver coil 120 are axially aligned with each other.

In an example, the Q-Factor for each transmitter coil may be determined prior to generating the HP_DPING. Further, one or more of the APING, DPING, and HP_DPING may be applied to a respective transmitter coil of the one or more power circuits 102 to form a round of pinging. For example, one HP_DPING may be applied to each transmitter coil of each power circuit to form a round of pinging followed by each transmitter coil detecting a response. As another example, one DPING may be applied to each transmitter coil of each power circuit to form a round of pinging followed by each transmitter coil detecting a response. The wireless transmitter 150 may perform one or more rounds of pinging followed detecting a respective response to determine whether to transmit a power signal by the transmit coil which detected a response.

In some examples, the wireless power transmitter 150 may have a sensing circuit which outputs a voltage across the transmitter coil 126 rather than a voltage indicative of the current in the transmitter coil 126 as described above. The controller 124 may receive this voltage to determine whether a response to a DPING or HP_DPING is received. Other signaling of the response to the controller 124 may be possible as well.

Example Methods

Figure 2:
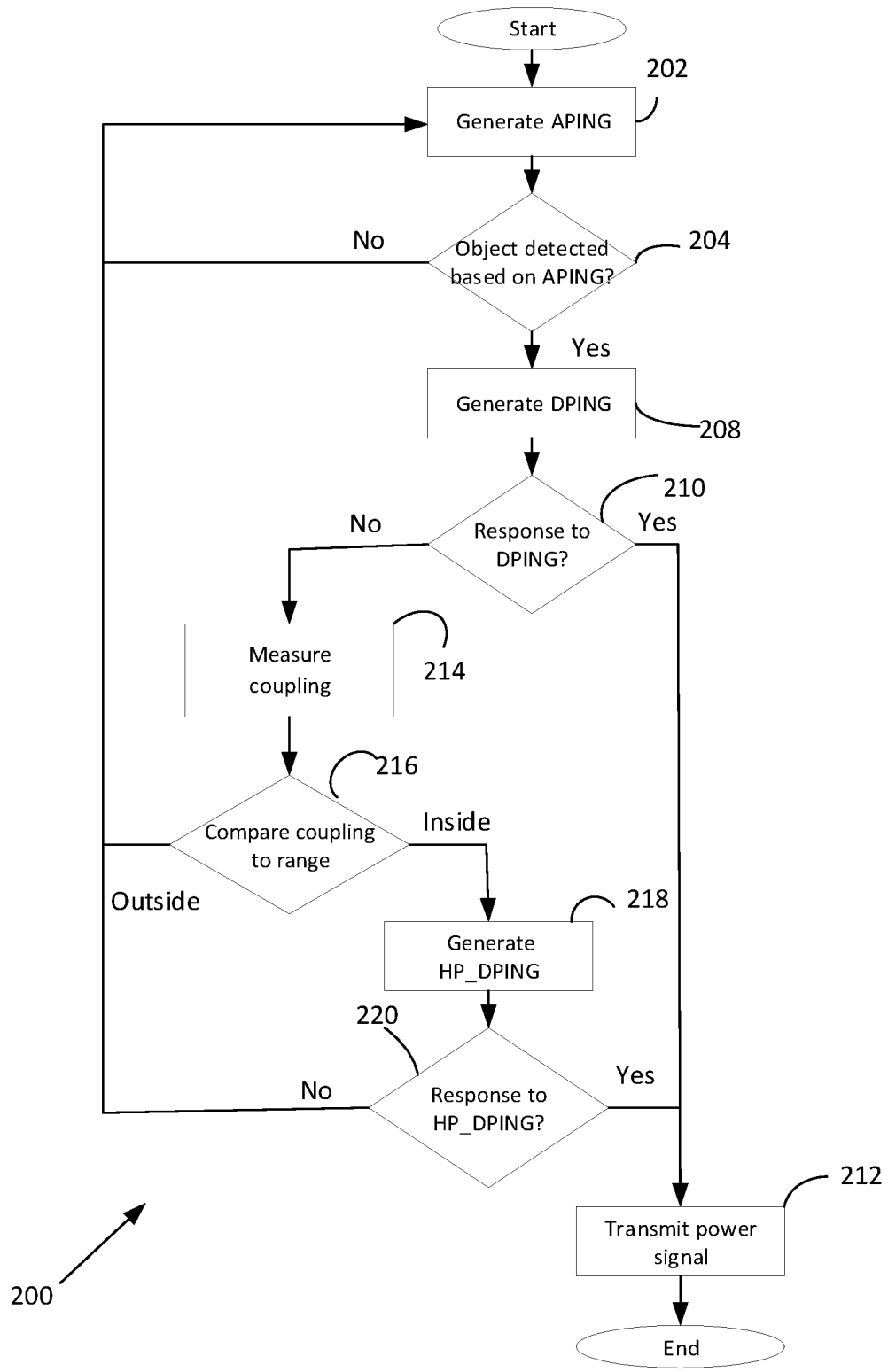
FIG. 2 is a flow chart of example functions to perform wireless power transmission in accordance with an embodiment.

FIG. 2 is a flow chart of example functions 200 to perform wireless power transmission in accordance with an embodiment of the invention. In an example, the components of the wireless power transmitter 150 may perform the functions 200.

The functions 200 of the wireless power transmission may begin at 202. At 202, the wireless power transmitter 150 generates APING which causes the wireless power transmitter 150 to transmit a power signal for a period of time to detect presence of a wireless power receiver 116 on the charging surface 114. In an example, the controller 104 is arranged to generate the APING based on a particular switching of the switches 108 which causes a current to be applied to the transmitter coil 126 which in turn transmits the power signal based on the APING. At 204, a determination is made whether a wireless power receiver 116 or foreign object is detected based on the APING. For example, a wireless power receiver 116 or foreign object is detected based on measuring a peak-to-peak current of the transmitter coil 126 which is sensed by the sensing circuit 122 as a peak-to-peak voltage indicative of the peak-to-peak current of the transmitter coil 126. If no wireless power receiver 116 or foreign object is detected, then processing returns to 202 and the APING generation is repeated. If a wireless power receiver 116 or foreign object is detected, then at 208, DPING is generated by the wireless power transmitter 150. The DPING may be a modulated signal with a specified power. In an example, the DPING has a longer period or at least equal peak-to-peak voltage than the APING and higher power. At 210, a determination is made whether a response to the DPING is detected. The response may be a signal strength packet which indicates that the wireless power receiver 116 is located on the charging surface 114. If a response to the DPING is detected, then the wireless power transmitter 150 may not generate another DPING. At 212, the transmitter coil 126 may output a power signal. In an example, the power signal output may be based on a modulated signal applied to the transmitter coil 126. The magnetic flux of the power signal may cause a current to be induced in the receiver coil 120 to charge the battery of the electronic device 118 or to power the electronic device 118.

If the response to the DPING is not detected, then at 214, the wireless power transmitter 150 may measure a coupling. In an example, the controller 104 may have a Q-Factor measurement circuit 124 to measure a Q-Factor indicative of a coupling of the transmitter coil 126 with a foreign object or wireless power receiver 116 on the charging surface 114. At 216, the controller 104 compares the coupling such as the Q-factor to a predetermined range. The predetermined range may be programmable in the wireless power transmitter 150 such as between 0 to 50 or 10 to 50 in an example, but other ranges such as 0 to 300 are also possible. The predetermined range may be chosen so that coupling with a foreign object on the charging surface 114 which would result in a small Q-Factor is distinguished from coupling with the wireless power receiver 116 on the charging surface 114 or no wireless power receiver 116 or foreign object on the charging surface 114. The predetermined range may also be chosen so that poor coupling between the wireless power transmitter 150 and the wireless power receiver 116 is distinguished. If the Q-Factor is inside a predetermined range, then at 218, the wireless power transmitter 150 may generate a HP_DPING. If the Q-Factor is outside the predetermined range, then the HP_DPING is not generated. Processing will return to 202.

At 220, the wireless power transmitter 150 determines whether a response to the HP_DPING is received. If a response is received, then at 212, the transmitter coil 126 is arranged to then transmit a power signal which results in the electronic device 116 being charged or powered. The response may be a signal strength packet which indicates that the electronic device 116 may be charged or powered. If a response to the HP_DPING is not received, then processing returns to 202. Because the HP_DPING is generated only when the Q-Factor is a certain range, a risk is reduced that generating the HP_DPING with the higher power than DPING would heat a foreign object located on the charging surface 114 and damage the foreign object or the charging surface 114 itself.

Figure 3:
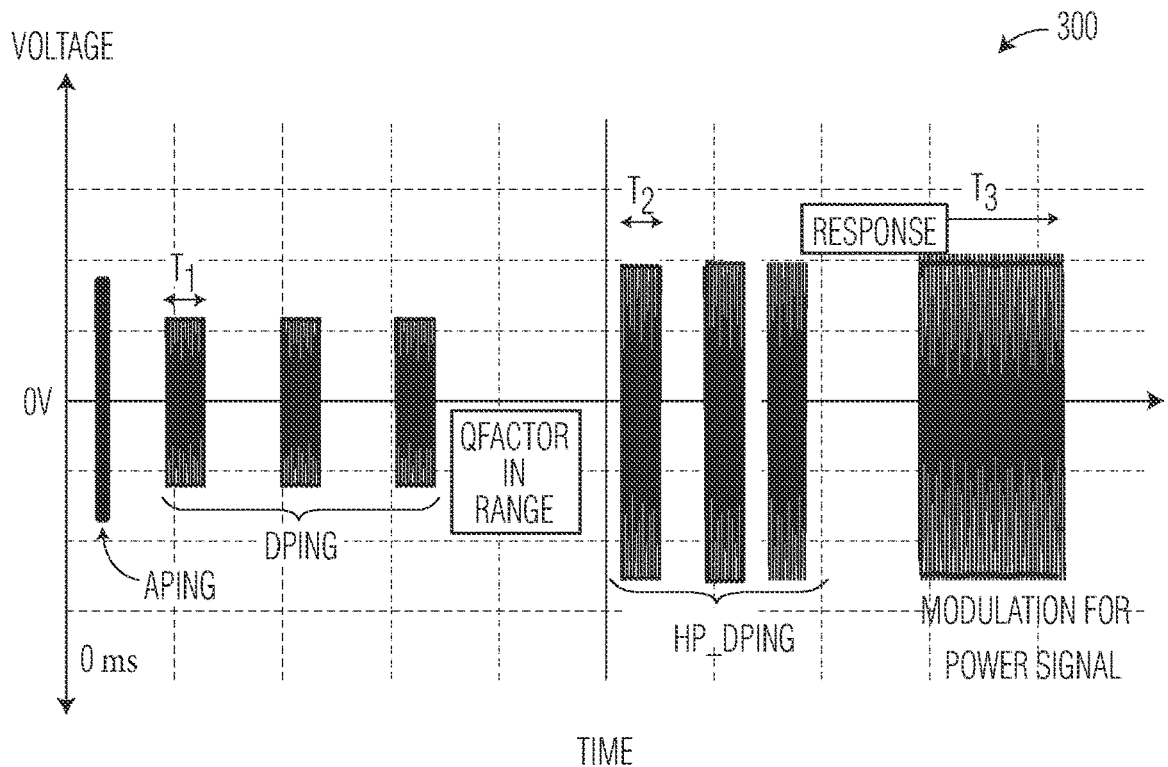
FIG. 3 illustrates an example operation of the wireless power transmitter having a low coupling with a wireless power receiver located on a charging surface in accordance with an embodiment.

FIG. 3 illustrates an example operation 300 of the wireless power transmitter 150 having a low coupling with the wireless power receiver 116 located on the charging surface 114 in accordance with an embodiment. Plot 300 illustrates a plurality of signals applied to the transmitter coil 126 as a function of voltage and time. In an example, the wireless power transmitter 150 may generate an instance of APING. An object on the charging surface 114 may be detected based on the APING and the DPING may be generated. In the operation 300, three instances of DPING is shown where each DPING is a pulse of a modulated signal and the three instances of DPING is three pulses in series each with a period T1. In an example, the charging pad 114 may include three transmitter coils. In the operation 300, three instances of DPING is shown where each DPING is applied to a respective transmitter coil of three transmitter coils to define a round of pinging. The wireless power transmitter 150 may not receive a response to the DPING but the Q-Factor of the wireless power transmitter 150 may be in the predetermined range. The wireless power transmitter 150 may generate the HP_DPING which results in receiving a response. In the operation 300, three instances of HP_PING are shown where each HP_DPING is a pulse of a modulated signal and the three instances of HP_DPING is three pulses in series each with a period T1. Each HP_PING is applied to a respective transmitter coil of three transmitter coils to define a round of pinging. In an example, the HP_DPING may have a higher peak-to-peak voltage than the DPING. Based on receiving at least one response, the wireless power transmitter 150 may then transmit a power signal via the transmitter coil which received the response to charge the wireless power receiver 116 located on the charging surface 114 with a low coupling to the wireless power transmitter 150 or power the electronic device 118. The power signal output may be based on a modulated signal with an peak-to-peak voltage at least equal to a peak-to-peak voltage of the HP_DPING and a period T3.

Figure 4:
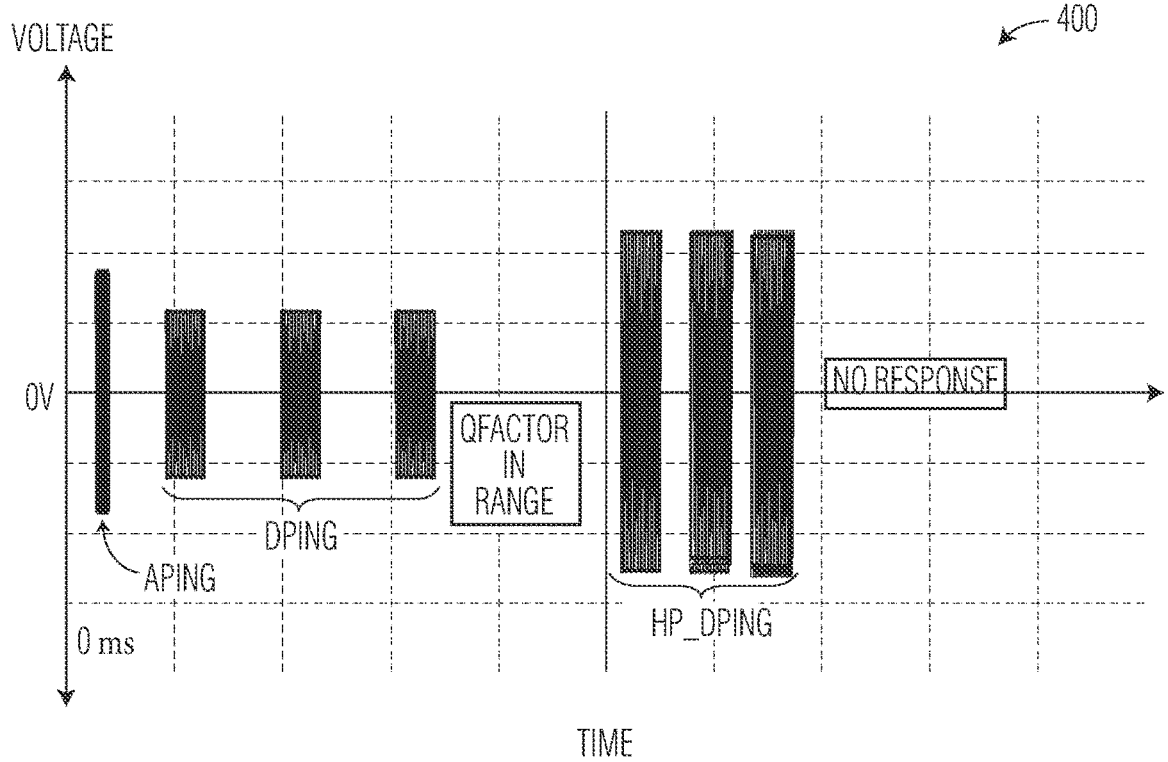
FIG. 4 illustrates another example operation of the wireless power transmitter having a low coupling with a wireless power receiver located on the charging surface in accordance with an embodiment.

FIG. 4 illustrates another example operation 400 of the wireless power transmitter 150 having a low coupling with the wireless power receiver 116 located on the charging surface 114 in accordance with an embodiment. In an example, the wireless power transmitter 150 generates one or more APING. A foreign object or wireless power receiver 116 located on the charging surface 114 may be detected based on the APING and then a plurality of DPING generated. The wireless power transmitter 150 may not receive a response to the DPING but the Q-Factor of the wireless power transmitter 150 may be in the predetermined range. The wireless power transmitter 150 may generate HP_DPING but not receive a response. In the operation 400, three instances of HP_PING is shown where each HP_PING is applied to a respective transmitter coil of three transmitter coils to define a round of pinging. Because no response is received, the wireless power transmitter 150 may not transmit a power signal because the coupling between the wireless power transmitter 150 and the wireless power receiver 116 may be still poor to support a charging of the battery of the electronic device 118 or powering of the electronic device 118.

Figure 5:
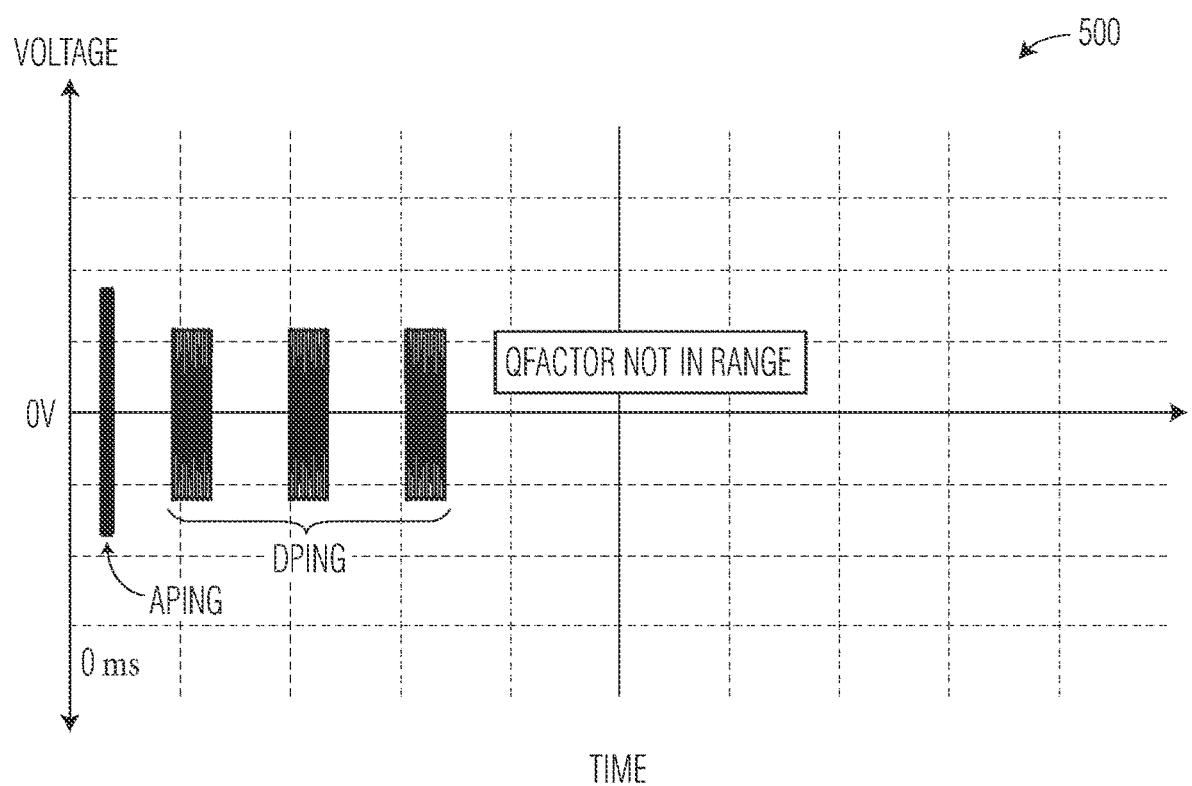
FIG. 5 illustrates an example operation of the wireless power transmitter having a low coupling with a foreign object located on the charging surface in accordance with an embodiment.

FIG. 5 illustrates an example operation 500 of the wireless power transmitter 150 having a low coupling with a foreign object located on the charging surface 114 in accordance with an embodiment. In an example, the wireless power transmitter 150 may generate one or more APING. A foreign object or wireless power receiver 116 located on the charging surface 114 may be detected based on the APING and the DPING is then generated. In the operation 300, three instances of DPING is shown where each DPING is applied to a respective transmitter coil of three transmitter coils to define a round of pinging. The wireless power transmitter 150 may not receive a response to the DPING. A determination is made that the Q-Factor between the wireless power transmitter and electronic device 116 is not within the predetermined range. In an example, the charging surface 114 may have a foreign object and no power signal is transmitted to initiate a charging or powering of the electronic device 118.

In an embodiment, a method for a wireless power transmitter to wirelessly transmit power is disclosed. The method comprises: applying a current or voltage to a transmitter coil to cause the transmitter coil to transmit a first power signal; determining a coupling of the wireless power transmitter based on no response to the first power signal being received; comparing the coupling to a predetermined range; applying a current or voltage to the transmitter coil to cause the transmitter coil to transmit a second power signal based on the coupling being in the predetermined range, wherein the second power signal has a higher power than the first power signal; detecting a response to the second power signal; and applying a current or voltage to the transmitter coil to cause the transmitter coil to transmit a third power signal to a wireless power receiver based on detecting the response to the second power signal. In an example, determining the coupling comprises performing a Q-Factor measurement. In an example, the Q-Factor indicates a rate of decay of a current or voltage of a resonant circuit of the wireless power transmitter. In an example, the second power signal is based on an first applied peak-to-peak voltage, the third power signal is based on a second applied peak-to-peak voltage, and the second applied peak-to-peak voltage is at least equal to the first applied peak-to peak voltage. In an example, the wireless transmitter comprises a plurality of transmitter coils; wherein applying the current or voltage to the transmitter coils comprises applying a pulse of the current or voltage to each transmitter coil; wherein detecting the response to the second power signal comprises each transmitter coil detecting a respective response, the method comprising repeating the applying and detecting for a predetermined number of rounds when the coupling is in the predetermined range until at least one response is detected. In an example, the method further comprises determining that the coupling is not in the predetermined range and transmitting a fourth power signal to detect presence of the wireless power receiver or a foreign object. In an example, the coupling is a Q-Factor measurement and the predetermined range is a range of Q-Factors. In an example, detecting the response to the second power signal comprises detecting a signal strength packet from the wireless power receiver. In an example, the coupling is a coupling factor.

In another embodiment, a controller in a wireless power transmitter is disclosed. The controller is configured to: cause a current or voltage to be applied to a transmitter coil of the power circuit to transmit a first power signal; determine a coupling of the wireless power transmitter based on no response to the first power signal being received; compare the coupling to a predetermined range; cause a current or voltage to be applied to the transmitter coil of the power circuit to transmit a second power signal based on the coupling being in the predetermined range, wherein the second power signal has a higher power than the first power signal; detect a response to the second power signal; and cause a current or voltage to be applied to the transmitter coil of the power circuit to transmit a third power signal to a wireless power receiver based on detecting the response to the second power signal. In an example, the controller configured to determine the coupling comprises the controller configured to perform a Q-Factor measurement. In an example, the Q-Factor indicates a rate of decay of a current or voltage of a resonant circuit of the wireless power transmitter. In an example, the second power signal is based on an first applied peak-to-peak voltage, the third power signal is based on a second applied peak-to-peak voltage, and the second applied peak-to-peak voltage is at least equal to the first applied peak-to peak voltage. In an example, the wireless transmitter comprises a plurality of transmitter coils; wherein the controller configured to apply the current or voltage to the transmitter coils comprises the controller configured to apply a pulse of the current or voltage to each transmitter coil; wherein the controller configured to detect the response to the second power signal comprises each transmitter coil detecting a respective response, the controller further configured to repeat the applying and detecting for a predetermined number of rounds when the coupling is in the predetermined range until at least one response is detected. In an example, the controller is further configured to determine that the coupling is not in the predetermined range and transmit a fourth power signal to detect presence of the wireless power receiver. In an example, the coupling is a Q-Factor measurement and the predetermined range is a range of Q-Factors. In an example, the controller is configured to detect the response to the second power signal comprises the controller configured to detect a signal strength packet from the wireless power receiver.

In yet another embodiment, a system is disclosed. The system comprises a wireless power transmitter having a controller and a transmitter coil, the transmitter coil located on a charging surface; and a wireless power receiver of an electronic device, the wireless power receiver located on the charging surface; wherein the controller is configured to apply a current or voltage to the transmitter coil to cause the transmitter coil to transmit a first power signal; determine a coupling of the wireless power transmitter to the wireless power receiver based on no response to the first power signal being received; compare the coupling to a predetermined range; apply a current or voltage to the transmitter coil to cause the transmitter coil to transmit a second power signal based on the coupling being in the predetermined range, wherein the second power signal has a higher power than the first power signal; detect a response to the second power signal; and apply a current or voltage to the transmitter coil to cause the transmitter coil to transmit a third power signal to the wireless power receiver to charge a battery of the electronic device based on the response to the second power signal. In an example, the wireless power transmitter has a Q-Factor measurement circuit to measure the coupling of the wireless power transmitter to the wireless power receiver. In an example, the predetermined range is a range of Q-Factors.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for a wireless power transmitter to wirelessly transmit power, the method comprising:
   applying a current or voltage to a transmitter coil to cause the transmitter coil to transmit a first power signal;
   determining a coupling of the wireless power transmitter based on no response to the first power signal being received;
   comparing the coupling to a predetermined range;
   applying a current or voltage to the transmitter coil to cause the transmitter coil to transmit a second power signal based on the coupling being in the predetermined range, wherein the second power signal has a higher power than the first power signal;
   detecting a response to the second power signal; and
   applying a current or voltage to the transmitter coil to cause the transmitter coil to transmit a third power signal to a wireless power receiver based on detecting the response to the second power signal.

2. The method of claim 1, wherein determining the coupling comprises performing a Q-Factor measurement.

3. The method of claim 2, wherein the Q-Factor indicates a rate of decay of a current or voltage of a resonant circuit of the wireless power transmitter.

4. The method of claim 1, wherein the second power signal is based on an first applied peak-to-peak voltage, the third power signal is based on a second applied peak-to-peak voltage, and the second applied peak-to-peak voltage is at least equal to the first applied peak-to peak voltage.

5. The method of claim 1, wherein the wireless transmitter comprises a plurality of transmitter coils; wherein applying the current or voltage to the transmitter coils comprises applying a pulse of the current or voltage to each transmitter coil; wherein detecting the response to the second power signal comprises each transmitter coil detecting a respective response, the method comprising repeating the applying and detecting for a predetermined number of rounds when the coupling is in the predetermined range until at least one response is detected.

6. The method of claim 1, further comprising determining that the coupling is not in the predetermined range and transmitting a fourth power signal to detect presence of the wireless power receiver or a foreign object.

7. The method of claim 1, wherein the coupling is a Q-Factor measurement and the predetermined range is a range of Q-Factors.

8. The method of claim 1, wherein detecting the response to the second power signal comprises detecting a signal strength packet from the wireless power receiver.

9. The method of claim 1, wherein the coupling is a coupling factor.

10. A controller in a wireless power transmitter, the controller configured to:
cause a current or voltage to be applied to a transmitter coil of the power circuit to transmit a first power signal; determine a coupling of the wireless power transmitter based on no response to the first power signal being received; compare the coupling to a predetermined range; cause a current or voltage to be applied to the transmitter coil of the power circuit to transmit a second power signal based on the coupling being in the predetermined range, wherein the second power signal has a higher power than the first power signal; detect a response to the second power signal; and cause a current or voltage to be applied to the transmitter coil of the power circuit to transmit a third power signal to a wireless power receiver based on detecting the response to the second power signal.

11. The controller of claim 10 configured to determine the coupling comprises the controller configured to perform a Q-Factor measurement.

12. The controller of claim 10, wherein the Q-Factor indicates a rate of decay of a current or voltage of a resonant circuit of the wireless power transmitter.

13. The controller of claim 10, wherein the second power signal is based on an first applied peak-to-peak voltage, the third power signal is based on a second applied peak-to-peak voltage, and the second applied peak-to-peak voltage is at least equal to the first applied peak-to peak voltage.

14. The controller of claim 13, wherein the wireless transmitter comprises a plurality of transmitter coils; wherein the controller configured to apply the current or voltage to the transmitter coils comprises the controller configured to apply a pulse of the current or voltage to each transmitter coil; wherein the controller configured to detect the response to the second power signal comprises each transmitter coil detecting a respective response, the controller further configured to repeat the applying and detecting for a predetermined number of rounds when the coupling is in the predetermined range until at least one response is detected.

15. The controller of claim 10 further configured to determine that the coupling is not in the predetermined range and transmit a fourth power signal to detect presence of the wireless power receiver.

16. The controller of claim 10, wherein the coupling is a Q-Factor measurement and the predetermined range is a range of Q-Factors.

17. The controller of claim 10 configured to detect the response to the second power signal comprises the controller configured to detect a signal strength packet from the wireless power receiver.

18. A system comprising:
a wireless power transmitter having a controller and a transmitter coil, the transmitter coil located on a charging surface; and
a wireless power receiver of an electronic device, the wireless power receiver located on the charging surface;
wherein the controller is configured to apply a current or voltage to the transmitter coil to cause the transmitter coil to transmit a first power signal; determine a coupling of the wireless power transmitter to the wireless power receiver based on no response to the first power signal being received; compare the coupling to a predetermined range; apply a current or voltage to the transmitter coil to cause the transmitter coil to transmit a second power signal based on the coupling being in the predetermined range, wherein the second power signal has a higher power than the first power signal; detect a response to the second power signal; and apply a current or voltage to the transmitter coil to cause the transmitter coil to transmit a third power signal to the wireless power receiver to charge a battery of the electronic device based on the response to the second power signal.

19. The system of claim 18, wherein the wireless power transmitter has a Q-Factor measurement circuit to measure the coupling of the wireless power transmitter to the wireless power receiver.

20. The system of claim 19, wherein the predetermined range is a range of Q-Factors.

* * * * *